(12) United States Patent
Kitching et al.

(10) Patent No.: US 11,965,784 B2
(45) Date of Patent: Apr. 23, 2024

(54) SENSOR FOR MEASURING THE FLEX OF A POLE

(71) Applicant: BAE SYSTEMS plc, London (GB)

(72) Inventors: Stuart John Kitching, Rochester (GB); Daniel Bishop, Rochester (GB)

(73) Assignee: BAE SYSTEMS plc, London (GB)

( * ) Notice: Subject to any disclaimer, the term of this patent is extended or adjusted under 35 U.S.C. 154(b) by 800 days.

(21) Appl. No.: 16/978,315

(22) PCT Filed: Mar. 5, 2019

(86) PCT No.: PCT/GB2019/050600
§ 371 (c)(1),
(2) Date: Sep. 4, 2020

(87) PCT Pub. No.: WO2019/171036
PCT Pub. Date: Sep. 12, 2019

(65) Prior Publication Data
US 2021/0003464 A1 Jan. 7, 2021

(30) Foreign Application Priority Data
Mar. 7, 2018 (GB) ...................... 1803647

(51) Int. Cl.
*G01L 1/12* (2006.01)
*B63H 16/04* (2006.01)
(Continued)

(52) U.S. Cl.
CPC .............. *G01L 1/122* (2013.01); *B63H 16/04* (2013.01); *G01L 5/0095* (2013.01); *G01L 5/169* (2020.01)

(58) Field of Classification Search
CPC ....... G01L 1/122; G01L 5/0095; G01L 5/169; B63H 16/04
See application file for complete search history.

(56) References Cited

U.S. PATENT DOCUMENTS 6,463,811 B1 * 10/2002 Putney ................ B25B 23/1425
73/862.21
10,016,158 B2 * 7/2018 Donohoe ........... G09B 19/0038
(Continued)

FOREIGN PATENT DOCUMENTS

| CN | 102160926 A | 8/2011 |
| EP | 3136069 A1 | 3/2017 |

(Continued)

OTHER PUBLICATIONS

International Search Report and Written Opinion received for PCT Application No. PCT/GB2019/050600, dated Apr. 23, 2019. 17 pages.

(Continued)

*Primary Examiner* — Manuel A Rivera Vargas
(74) *Attorney, Agent, or Firm* — Finch & Maloney PLLC

(57) ABSTRACT

A sensor for measuring the flex of a pole when exposed to one or more forces, the sensor including at least one magnet and Hall Effect sensor combination, wherein the at least one magnet and Hall effect sensor are at a predetermined position relative to one another when there are no forces acting on the pole and which are movable relative to one another when forces act on the pole, such that a signal proportional to the relative movement is generated by the sensor.

20 Claims, 4 Drawing Sheets

(51) Int. Cl.
    *G01L 5/00*     (2006.01)
    *G01L 5/169*     (2020.01)

(56) References Cited

U.S. PATENT DOCUMENTS

| | | | |
|---|---|---|---|
| 2004/0255687 | A1 | 12/2004 | Dukart |
| 2005/0170711 | A1* | 8/2005 | Spencer ............... B63H 16/00 440/21 |
| 2007/0093360 | A1 | 4/2007 | Neff et al. |
| 2009/0197485 | A1* | 8/2009 | Gulas ............... B63H 23/24 440/49 |
| 2010/0167606 | A1* | 7/2010 | Luecker ............ A63B 24/0062 440/101 |
| 2011/0063120 | A1 | 3/2011 | Ebner |
| 2011/0082009 | A1 | 4/2011 | Ranky et al. |
| 2014/0331829 | A1* | 11/2014 | King ................... G01L 25/003 81/467 |
| 2016/0220808 | A1 | 8/2016 | Hyde et al. |
| 2016/0263438 | A1 | 9/2016 | Donohoe |
| 2016/0271438 | A1 | 9/2016 | Weisz et al. |
| 2017/0190404 | A1* | 7/2017 | Mandanis ............ B63H 16/04 |
| 2018/0162320 | A1 | 6/2018 | Lee |
| 2018/0285496 | A1 | 10/2018 | Le Chevalier et al. |
| 2019/0107450 | A1 | 4/2019 | Ewans |
| 2019/0262697 | A1 | 8/2019 | Kim et al. |
| 2020/0316365 | A1 | 10/2020 | Hyde et al. |
| 2021/0008414 | A1 | 1/2021 | Bishop et al. |

FOREIGN PATENT DOCUMENTS

| | | |
|---|---|---|
| GB | 2405947 A1 | 3/2005 |
| GB | 2414195 A1 | 11/2005 |
| GB | 2542139 A1 | 3/2017 |
| WO | 2010006606 A1 | 1/2010 |
| WO | 2013006145 A1 | 1/2013 |
| WO | 2013083278 A2 | 6/2013 |
| WO | 2017072453 A1 | 5/2017 |
| WO | 2019171036 A1 | 9/2019 |
| WO | 2019171037 A1 | 9/2019 |

OTHER PUBLICATIONS

GB Search Report under Section 17(5) received for GB Application No. 1803647.5 dated Sep. 7, 2018. 3 pages.

International Preliminary Report on Patentability received for PCT Application No. PCT/GB2019/050600, dated Sep. 17, 2020. 11 pages.

International Preliminary Report on Patentability received for PCT Application No. PCT/GB2019/050601, dated Sep. 17, 2020. 8 pages.

International Search Report and Written Opinion received for PCT Application No. PCT/GB2019/050601, dated Jun. 12, 2019. 12 pages.

GB Search Report under Section 17(5) received for GB Application No. 1803645.9 dated Sep. 7, 2018. 4 pages.

Rowing in Motion, "Designing a Measurement System for Rowing: Force and Power on the Oar", Article dated: Aug. 5, 2014; Accessed at: https//www.rowinginmotion.com/designing-measurement-system-rowing-force-power-oar/ Accessed Sep. 6, 2018. 10 pages.

Kristina, "Measuring rowing technique", Article dated: Aug. 23, 2017. Accessed at: https://www.rowingperformance.com/blog/measuring-rowing-technique—Accessed Sep. 6, 2018. 9 pages.

* cited by examiner

SENSOR FOR MEASURING THE FLEX OF A POLE

The present invention relates to a method and system for measuring the bending of rowing oars, particularly but not exclusively using a novel type of sensor.

Rowing is a very competitive sport and the performance of the rower is continually being assessed in order to determine ways in which to improve the performance of the rower. In order to do this, measurements of the rowers' performance are analysed in real time to identify appropriate improvements.

It is known to use so called smart oars, which include an integrated system in which the performance of the rower can be assessed. These types of system have not proved to be particularly effective. Measurements and the movements of the structures within the rowing boat are generally performed by bond strain gauges and sensors. These are typically located on the outside of the structure and measure the movement between two points. This tends to be difficult to achieve, as it is difficult to adhere a sensor on the outside of a long pole such as an oar. The sensor can be knocked off or easily damaged. In addition, bonding to composite materials, such as carbon fibre and the like, of these types of sensors can be particularly difficult due to the nature of the materials.

In order to assess the performance of a rower it is specifically useful to measure the bend at a predetermined location along the oar to assess the power and direction of the power that the rower is imparting on the oar. To this end present invention relates to a recognition of the fact it is difficult to measure forces generated by a rower relative to the boat is something quite difficult to solve. Thus, a need exists for a new type of measurement device for determining the forces and bending of an oar to enable a better analysis of the performance of the rower.

Accordingly, one object of the present invention is to provide a measuring device or sensor to help in the identification of the performance of a rower and to determine manners in which that performance can be meditated.

SUMMARY

According to an aspect of the present invention there is provided a sensor for measuring the flex of a pole when exposed to one or more forces, the sensor including at least one magnet and Hall Effect sensor combination, wherein the at least one magnet and Hall effect sensor are at a predetermined position relative to one another when there are no forces acting on the pole and which are movable relative to one another when forces act on the pole, such that a signal proportional to the relative movement is generated by the sensor.

Preferably, the at least one magnet and Hall Effect sensor combination, are positioned on the sensor so that they are in alignment with one another when there are no forces acting on the pole.

Preferably, the sensor comprises a first portion which is adapted to move with the pole as forces are applied; and a second portion which is not adapted to so move, thereby giving rise to the relative movement.

Preferably, one of the at least one magnet and Hall Effect sensor combination are located on one of the first and second portions and the other one on the other portion.

Preferably, the sensor is adapted to measure flex in one of more axes.

Preferably, the sensor is located to an external surface of the pole.

Preferably, the sensor is formed from a first portion adapted to locate on the pole and move therewith when the pole is acted upon by forces; and a second portion that is not adapted to move with the pole.

Preferably, the sensor includes a body supporting the first and second portions such that movement of the pole gives rise to a relative movement between the first and second portion.

Preferably, the sensor includes a slidable member supporting one of the at least one magnet and Hall Effect sensor combination movable relative to the second portion to adjust the sensitivity of the at least one magnet and Hall Effect sensor combination.

Preferably, the sensor is located internally inside of the pole.

Preferably, the sensor further comprises a cylindrical first portion adapted to fit tightly within the pole and move therewith when the pole is acted upon by forces; and a protruding second portion that is not adapted to move with the pole and which has a point in juxtaposing with an end surface of the cylindrical first portion.

Preferably, the cylindrical first portion includes a plurality of flexible spiral elements connected by two end portions and wherein the protruding portion extends from one end portion towards an internal surface of the second end portion.

Preferably, the at least one magnet and Hall Effect sensor combination are located on the internal surface and the end of the protruding portion juxtaposed to the internal surface.

Preferably, the sensor further includes a memory for collecting and storing the signal.

Preferably, the sensor further includes a processor for analysing the signals.

Preferably, the pole is an oar.

According to a further aspect of the present invention there is provided an oar having a sensor for measuring the flex thereof according another aspect of the invention.

DESCRIPTION OF THE DRAWINGS

In general, the present invention relates to a sensor for use in or on an oar which enables measurements of flex, power, movement and then performance of the user. The sensor used in or on the oar is a Hall Effect sensor which makes use of the Hall Effect to measure the different parameters required for the performance measurements.

The present invention relates to a novel technique to measure the bend of both a sweep and sculling oar and thus to determine the force of the blade. This is achieved by means of utilising a novel linear Hall Effect sensor within a custom flexible housing which mounts both the Hall Effect sensor and a fixed magnet, allowing free movement of the oar and thus changing the magnetic field recorded at the sensor as the Hall Effect sensor and magnet change position relative to each other.

As mentioned above, the present invention makes use of a Hall Effect sensor. A Hall Effect sensor is a transducer that is capable of baring its output voltage in response to a magnetic field. In its simplest form a Hall Effect sensor generates a voltage as a result of a known magnetic field. By measuring changes in the voltage, the relative position of one or more magnets can be deduced and from this measurement various calculations can be made.

Figure 1:
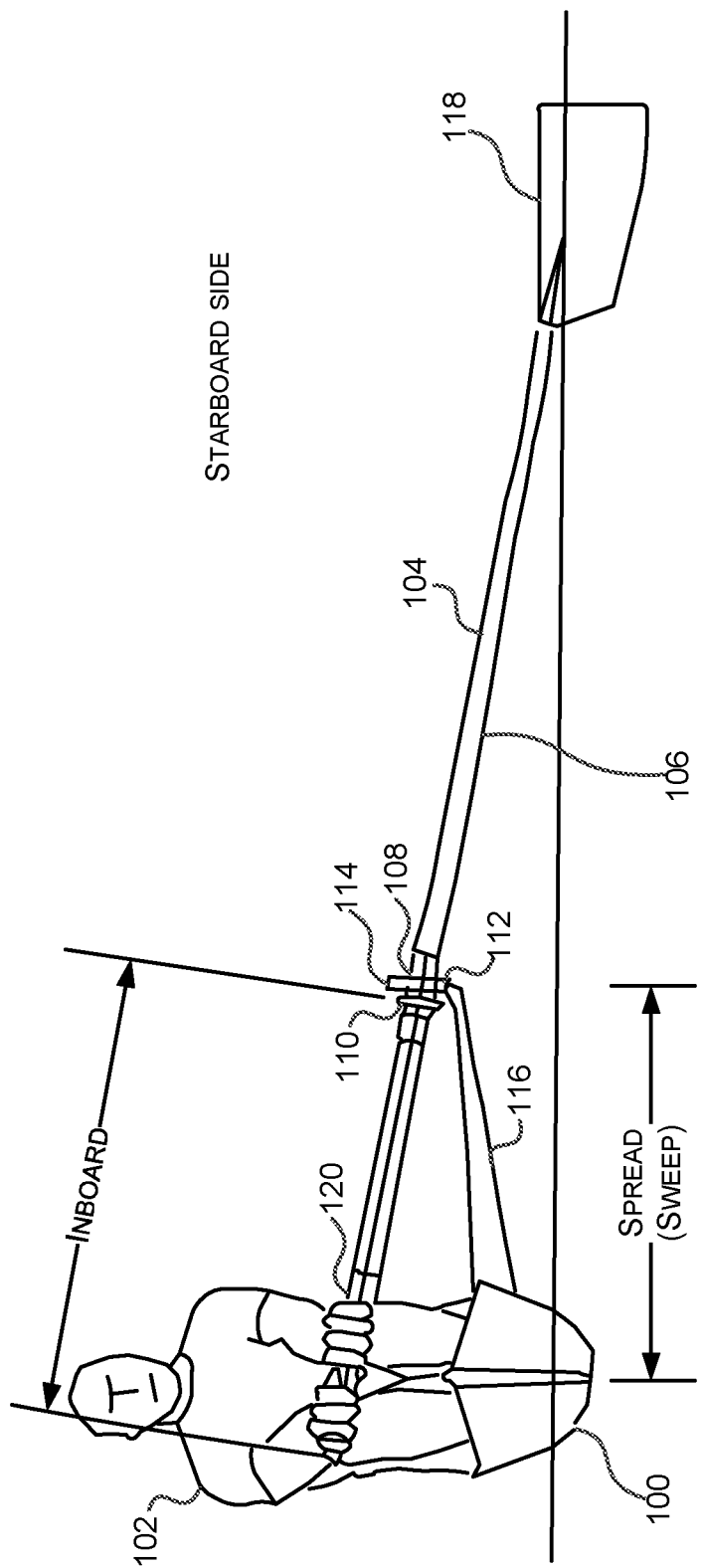
FIG. 1 is a diagram showing a rowing boat, according to an embodiment of the present invention.

FIG. 1 shows a rowing boat 100 having a rower 102 manipulating an oar 104. The oar includes a shaft 106 having a sleeve 108 and a collar 110 at some point along the length of the shaft. The sleeve 108 and collar 110 may be held in an oarlock or gate 112, secured by a pin 114, either on the side of the boat or on a rigger 116. The oar also includes a blade 118 and a handle 120. In accordance with the present invention, a sensor, as will be described below, is located at a position on the oar where it does not interfere with the operation thereof. Ideally, the sensor is located either between the handle and the sleeve or the sleeve and the blade. The preferred position for locating the oar sensor is outside of the pivot point towards the outboard section of the oar.

As different rowers have different lengths of arm and row in a different way, the flexibility of being able to position the sensor in any required location has a number of advantages to enable the sensor to be adapted to the rower and the boat in question.

A common feature of each embodiment of the present invention is the fact that the sensor is designed to align one or more magnets with one or more Hall Effect sensors when no bend is present on the oar. As the oar flexes the alignment of the magnet and Hall Effect sensor changes such that a voltage is generated at one or more of the sensors enabling a measurement of movement or bend to be determined or calculated.

Figure 2:
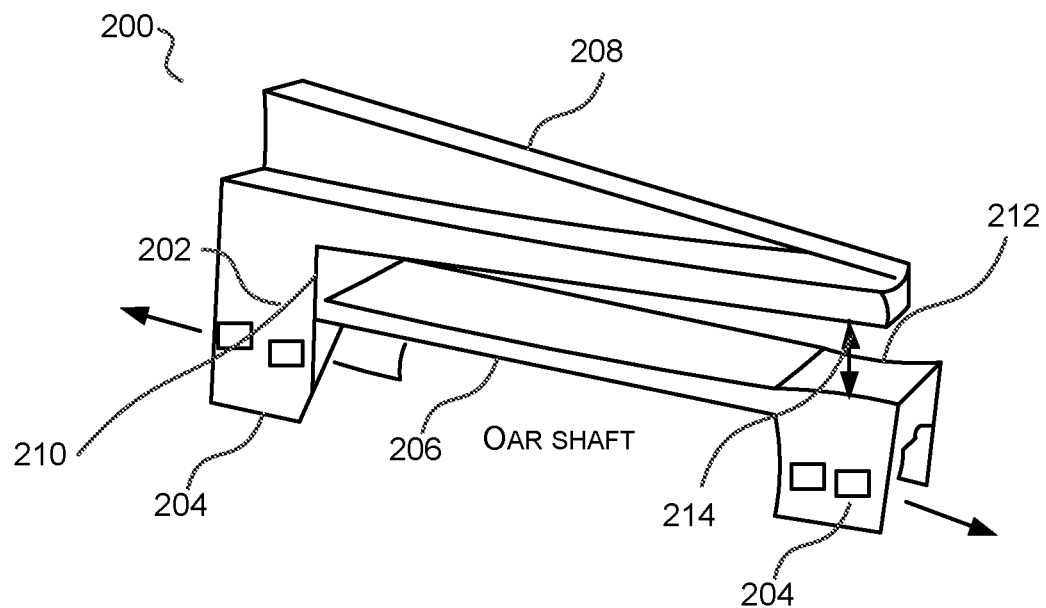
FIG. 2 is a diagram showing a first embodiment of the sensor in situ on a rowing oar, according to an embodiment of the present invention.
Figure 3:
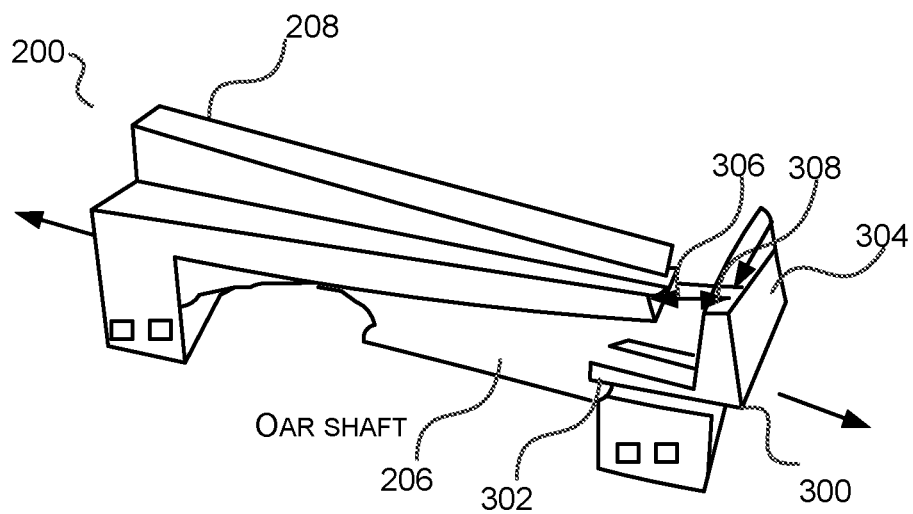
FIG. 3 is a second embodiment of the sensor in situ on a rowing oar, according to an embodiment of the present invention.

In an embodiment of the invention, an oar sensor is located externally on the oar. The sensor in this case may be as shown in FIG. 2 or 3. The oar sensor 200 in each case includes a body 202 having one or more U-shaped supports 204 adapted to fit and mount the sensor around the shaft of the oar. The body 202 includes a lower portion 206 which runs along a portion of the shaft and an upper portion 208 that runs parallel to the lower portion and is displaced by a predetermined distance by a spacing portion 210.

The U-shaped supports include fastenings to hold the oar sensor 200 on the oar. The fastening can take any form and include for example straps or adhesives In the example shown, there are two fastening, but it will be appreciated that there may be more or less.

The lower portion 206 includes one of a magnet or Hall Effect sensor combination 212, 214. The upper portion 208 include the other or the magnet or Hall Effect sensor 212, 214. There may be one or more magnets and Hall Effect sensors in each combination. There may be more than one combination in each oar sensor positioned in the same or different ways to measure similar or different effects.

In the embodiment in FIG. 2, the magnet (in this case 212) and Hall Effect sensor (in this case 214) are positioned opposite one another on respectively the upper facing surface of the lower portion and the lower facing surface of the upper portion. At rest, the relative spatial positions of the sensor and the magnet are known. For example, if the magnet and Hall Effect sensor are circular the central point of each is aligned with the central point of the other at rest. Clearly, the Hall Effect sensor and magnet can be different shapes and sizes and do not need to both have the same shape and size, as long as their relative positions are known at rest. The upper portion, as shown in FIG. 2, is elongated and is slightly shorter than the lower portion.

In use, for example when attached to an oar the movement of the oar causes the gap between the upper and lower portion to change as a result of movements of the shaft caused by the rower. In this embodiment, the measurements are in a single axis and the movements measured are the changes in the gap between the Hall Effect sensor and the magnet. The result is an output signal which is proportional to the bend of the oar shaft at different points in the stroke of the rower. For the external sensors the body is strapped onto the oar as tight as possible, for example glued in place. As the oar bends the lower portion 206 will flex with the shaft. 204 and both ends remain glued and secured. As the lower portion 206 flexes then a gap will open up between the sensor and magnet as 208 continues to remain at 90 degrees to the body 202.

In the FIG. 3 embodiment, like features have the same reference numbers as FIG. 2. This embodiment is intended to measure forces in two axes. In this embodiment, there is an additional adjustable slider 300 which has a lower section 302 slidable relative to the lower portion 206 and at right angles thereto a facing section 304 facing the end of the upper portion 208. In this embodiment, the upper portion is shorter than that shown in the FIG. 2 embodiment. The adjustable slider can be used to adjust the sensitivity of the magnet and Hall Effect combination. The magnet 306 and Hall Effect sensor 308 are located opposite each other at respectively the end of the upper portion and the facing surface of the adjustable slider. As will be appreciated the magnet and Hall Effect sensor could be the other way round.

In the FIG. 3 embodiment, the oar sensor 200 is mounted on the shaft of the oar and can be used to measure the movements of the oar by means of the alignment changes between the magnet and the Hall Effect sensor. This results in an output proportional to the bend of the oar in two axes. In this example, both ends are glued in place and fixed to the oar so that any flex is accommodated by 206 thus causing magnet 306 to misalign with Hall Effect sensor 308.

Figure 4:
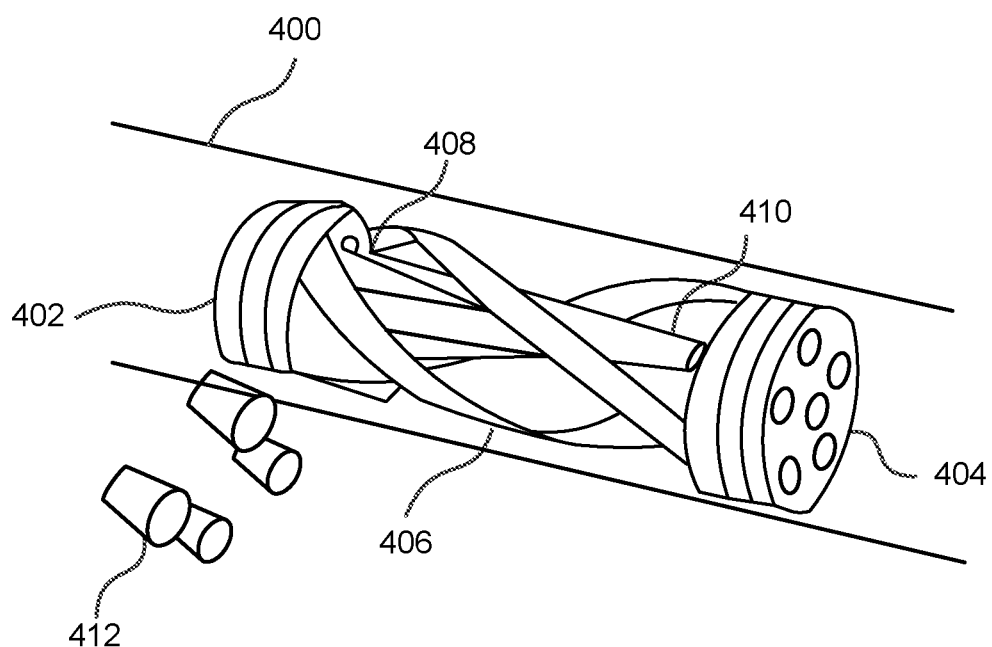
FIG. 4 is a third embodiment of the present invention showing a sensor for use that is embedded within in a rowing oar, according to an embodiment of the present invention.

FIG. 4 relates to a further embodiment of the invention, intended to be seated internally within the core of the oar shaft. An oar sensor 400 is cylindrical and includes two circular end portions 402, 404. The end portions are connected by a plurality of flexible spiral members 406 forming an edge to the cylinder. One end portion 402 includes a protrusion 408 which extends from the end portion to a point 410 and which is in juxtaposition to the second end portion 404. The Hall Effect sensor and magnet combination are mounted on the point 410 and an inwardly facing surface of the second end portion 404. As before, they could be the other way round. The sensor may include one or one plugs 412 (not shown in situ) which ensure the oar sensor 400 is tightly fitted into the core of the shaft. The plugs act to adjust the overall diameter of the oar sensor 400 by forcing the two end portions closer together so that the spiral members push out and thus engage with the internal wall of the oar. Any movement of the oar will give rise to alignment changes between the magnet and the Hall Effect sensor which gives rise to an output proportional to the bend in two axes in the oar.

The oar sensors 200, 400 can include processing and memory devices to enable collection and/or processing of data received from the magnet and Hall Effect sensor combination over time. In addition, other sensors and measurements may be made and collected in conjunction with the oar sensor measurements, for example temperature to help mathematically null-out any effect of localised temperature swing in the proximity of the bend sensors.

The output of each sensor can be analysed to determine the flex and movement of the oar relative to it's "at rest position". From known parameters of movements of the oar, for example, the amount of flex per kilogram it is possible to calculate the force imparted on the oar at any time. From these measurements and other data collected at the time or otherwise it is possible to build up an accurate and thorough assessment of the performance of a rower.

As will be appreciated an oar is a long thin structure, such as a pole, which is exposed to stresses and movements as it is used. The present invention offers a way in which these movements can be measured and then used to determine the causes and effects of such movements. Accordingly, the oar sensor may also be of use to measure the strains, stresses and flexions of other similar structures, for example a yacht mast or a pole vaulting pole, in the sports environment. But similarly any long relatively thin structure that is subjected to stresses, strains and flexions.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. A sensor for measuring the flex of an oar when exposed to one or more forces, the sensor comprising:
   a magnet and Hall Effect sensor combination, wherein the magnet and the Hall effect sensor of the combination are at a predetermined position relative to one another when there are no forces acting on the oar and which are movable relative to one another when forces act on the oar, such that a signal proportional to the relative movement is generated by the sensor;
   a cylindrical first portion locatable inside of the oar and configured to move with the oar when the oar is acted upon by forces; and
   a protruding second portion having an end in juxtaposition with an end surface of the cylindrical first portion.

2. The sensor of claim 1, wherein the sensor is attachable to an external surface of the oar.

3. The sensor of claim 2, wherein the sensor includes a first portion fixedly attachable at one or more positions along the external surface of the oar and adapted to flex therewith when the oar is acted upon by forces, and a second portion extending over the first portion and spaced apart from the first portion.

4. The sensor of claim 3, wherein the sensor includes a body supporting the first and second portions such that movement of the oar gives rise to a relative movement between the first and second portions.

5. The sensor of claim 3, further comprising a slidable member supporting one of the magnet and the Hall Effect sensor of the combination movable relative to the second portion to adjust the sensitivity of the magnet and Hall Effect sensor combination.

6. The sensor of claim 1, further including a memory for collecting and storing the signal.

7. The sensor of claim 6, further including a processor for analysing the signal.

8. The sensor of claim 1, wherein the magnet and the Hall Effect sensor of the combination are positioned on the sensor so that they are in alignment with one another when there are no forces acting on the oar.

9. The sensor of claim 1, wherein the sensor comprises a first portion and a second portion, the first portion having first and second end regions attachable to the oar, the first portion being adapted to move with the oar as forces are applied, and the second portion having a third end region attached to the first end region of the first portion and a free end positioned spaced apart from the second end region of the first portion.

10. The sensor of claim 1, wherein the magnet of the combination is located on one of the end surface of the cylindrical first portion or the end of the second portion, and the Hall Effect sensor of the combination is located on the other of the end surface of the cylindrical first portion or the end of the second portion.

11. The sensor of claim 1, wherein the sensor is adapted to measure flex in one of more axes.

12. The sensor of claim 1, wherein the sensor is locatable inside of the oar.

13. The sensor of claim 1, wherein the magnet and Hall Effect sensor combination is one of a plurality of such combinations.

14. A sensor for measuring the flex of a pole when exposed to one or more forces, the sensor comprising:
    a magnet and Hall Effect sensor combination locatable inside of the pole, wherein the magnet and the Hall effect sensor of the combination are at a predetermined position relative to one another when there are no forces acting on the pole and which are movable relative to one another when forces act on the pole, such that a signal proportional to the relative movement is generated by the sensor;
    a cylindrical first portion adapted to fit tightly within the pole and move therewith when the pole is acted upon by forces; and
    a protruding second portion that is not adapted to move with the pole and which has an end in juxtaposition with an end surface of the cylindrical first portion.

15. The sensor of claim 14, wherein the cylindrical first portion includes a plurality of flexible spiral elements connected by two end portions, and wherein the protruding portion extends from one of the end portions towards an internal surface of the other end portion.

16. The sensor of claim 15, wherein one of the magnet and the Hall Effect sensor of the combination is located on the internal surface, and the other one of the magnet and the Hall Effect sensor of the combination is located on the end of the protruding portion juxtaposed to the internal surface.

17. The sensor of claim 14, wherein the pole is an oar.

18. An oar comprising the sensor of claim 14.

19. An oar comprising:
- a sensor for measuring the flex of the oar when exposed to one or more forces, the sensor disposed within the oar and comprising:
    - a magnet and Hall Effect sensor combination, wherein the magnet and the Hall effect sensor of the combination are at a predetermined position relative to one another when there are no forces acting on the oar and which are movable relative to one another when forces act on the oar, such that a signal proportional to the relative movement is generated by the sensor;
    - a cylindrical first portion including first and second circular end portions and a plurality of flexible spiral members connecting the first and second circular end portions; and
- a protrusion extending from the first circular end portion and having an end in juxtaposition with an internal surface of the second circular end portion.

20. The oar of claim 19, wherein the sensor further comprises a body having a first portion, a second portion, and a spacing portion;
- wherein the first portion is configured to be positioned along a region of a shaft of the oar and includes first and second ends configured to be attached to the shaft of the oar;
- wherein the spacing portion is attached to the first end of the first portion;
- wherein the second portion includes a first end attached to the spacing portion and a free end positioned spaced apart from the second end of the first portion, a gap distance between the second end of the first portion and the free end of the second portion being determined by the spacing portion;
- wherein the magnet of the combination is located on one of the second end of the first portion or the free end of the second portion, and the Hall sensor of the combination is located on the other of the second end of the first portion or the free end of the second portion.

* * * * *